US012610167B2

(12) United States Patent
Yuan

(10) Patent No.: US 12,610,167 B2
(45) Date of Patent: Apr. 21, 2026

(54) DIRECTIONAL BILATERAL SOUND INTAKE-BASED MIC ASSEMBLY AND ELECTRONIC DEVICE

(71) Applicant: AAC ACOUSTIC TECHNOLOGIES (SHENZHEN) CO., LTD., Shenzhen (CN)

(72) Inventor: Junhao Yuan, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 196 days.

(21) Appl. No.: 18/401,292

(22) Filed: Dec. 29, 2023

(65) Prior Publication Data

US 2025/0039585 A1 Jan. 30, 2025

Related U.S. Application Data

(63) Continuation of application No. PCT/CN2023/109892, filed on Jul. 28, 2023.

(51) Int. Cl.
*H04R 1/02* (2006.01)
*H04R 1/40* (2006.01)

(52) U.S. Cl.
CPC ............ *H04R 1/028* (2013.01); *H04R 1/406* (2013.01); *H04R 2201/029* (2013.01)

(58) Field of Classification Search
CPC .......... H04R 1/028; H04R 1/406; H04R 1/08; H04R 2201/029; H04R 2499/11
See application file for complete search history.

(56) References Cited

FOREIGN PATENT DOCUMENTS

| | | | |
|---|---|---|---|
| CN | 205754727 U | * | 11/2016 |
| CN | 214315548 U | * | 9/2021 |
| CN | 218387906 U | * | 1/2023 |

* cited by examiner

*Primary Examiner* — Yogeshkumar Patel
(74) *Attorney, Agent, or Firm* — Wiersch Law Group

(57) ABSTRACT

Disclosed are a directional bilateral sound intake-based MIC assembly and an electronic device. The electronic device includes the directional bilateral sound intake-based MIC assembly. The MIC assembly includes a front shell with paired sound inlet holes and a microphone arranged on an inner side of the front shell. The microphone has two receiving holes. The MIC assembly further includes a fixture assembled within the inner side of the front shell. An assembling chamber and two sound inlet channels in communication with the assembling chamber are defined in the fixture. The microphone is mounted within the assembling chamber. The two receiving holes of the microphone are in communication with the two sound inlet channels respectively. The two sound inlet channels are in communication with a same pair of two sound inlet holes respectively.

18 Claims, 6 Drawing Sheets

A-A

B-B

DIRECTIONAL BILATERAL SOUND INTAKE-BASED MIC ASSEMBLY AND ELECTRONIC DEVICE

CROSS REFERENCE TO RELATED APPLICATIONS

This application is a continuation of PCT Patent Application No. PCT/CN2023/109892, filed Jul. 28, 2023, which is incorporated by reference herein in its entirety.

TECHNICAL FIELD

The present disclosure relates to the technical field of acoustic-electro conversion, and in particular, relates to a directional bilateral sound intake-based MIC assembly and an electronic device.

BACKGROUND

MIC, scientifically termed as a transducer, is an energy conversion device that converts acoustic signals into electrical signals, transliterated from the English word "microphone." Many devices with audio transmission abilities are equipped with microphones, such as AR glasses, smart phones, and the like.

Typically, microphones are designed for single-sided sound intake, which require sealing only on one side during mounting. However, when dealing with the design of directional bilateral sound intake-based microphones, the mounting structure for single-sided sound intake-based microphones is not suitable. Where the mounting structure for single-sided sound intake-based microphones is still used, two through holes communicated with the microphone need to be defined in the shell of the electronic device. Using a mold results in complex molding, while employing computerized numerical control (CNC) machining is subjected to high costs. Additionally, drilling small holes easily causes drill bits to break, making size control challenging and resulting in unacceptable sharp edges in appearance. As a result, it is difficult to meet product requirements.

SUMMARY

The present disclosure is intended to provide a directional bilateral sound intake-based MIC assembly and an electronic device, which are capable of satisfying aesthetic design requirements while ensuring performance, and achieving low-cost, high-yield mass production of molds.

A directional bilateral sound intake-based MIC assembly is provided. The MIC assembly includes a front shell with paired sound inlet holes and a microphone disposed on an inner side of the front shell. The microphone has two receiving holes. The MIC assembly further includes a fixture disposed within the inner side of the front shell, an assembling chamber and two sound inlet channels in communication with the assembling chamber, the microphone is mounted within this assembling chamber, the two receiving holes of the microphone are in communication with the two sound inlet channels respectively, and the two sound inlet channels are in communication with a same pair of two sound inlet channels respectively.

As an improvement, the two sound inlet channels are connected to two opposite sides of the assembling chamber respectively.

As an improvement, the MIC assembly further includes a soft elastic member wrapped around an outer side of the microphone and embedded within the assembling chamber, and a first passage hole configured to communicate the receiving holes with a corresponding sound inlet channel is defined in the soft elastic member.

As an improvement, a sealing rib encircling the first passage hole and abutting against an inner wall of the assembling chamber is arranged on an outer side of the soft elastic member.

As an improvement, the MIC assembly further includes a bonding piece sandwiched between the front shell and the fixture, and a second passage hole communicating the sound inlet channel with a corresponding sound inlet hole is defined in the bonding piece.

As an improvement, the bonding piece is made of a foamed porous material, and adhesive layers is provided on both sides of the bonding piece.

As an improvement, the fixture is protruded on one side close to the front shell to form a limiting platform, the inner side of the front shell is recessed to form a limiting groove matching the limiting platform, and a limiting hole allowing the limiting platform to pass through is defined in the bonding piece.

As an improvement, at least two spaced mounting columns are arranged on the inner side of the front shell, mounting slots in one-to-one correspondence to the mounting columns are defined in one side of the fixture, the mounting columns are embedded in the mounting slots, and the fixture is secured to the mounting columns by screws.

As an improvement, two sets of paired sound inlet holes arranged perpendicular to each other are defined in the front shell, the MIC assembly includes two microphones in one-to-one correspondence to the two sets of paired sound inlet holes, and two assembling chambers configured to separately mount the two microphones and sound inlet channels configured to communicate the assembling chambers with the sound inlet holes in the corresponding set are defined in the fixture.

An electronic device is provided. The electronic device includes the directional bilateral sound intake-based MIC assembly as described above.

The beneficial effects of the embodiments of the present disclosure lie in the fact that, in this design, by incorporating a separate fixture to be assembled with the inner side of the front shell, the microphone is disposed within the assembling chamber of the fixture. The paired sound inlet holes in the front shell are communicated to the receiving holes of the microphone via the two sound inlet channels within the fixture, such that performance of the electronic device is ensured. Both the front shell and the fixture can be independently machined. The sound inlet holes in the front shell allow more freedom and eliminate unacceptable sharp edges, thereby meeting aesthetic design requirements. The external ports of the sound inlet channels on the fixture are not constrained by appearance and can be machined using various methods such as molds or CNC. Particularly, molds achieve low-cost, high-yield mass production with simplified designs and lower costs.

DETAILED DESCRIPTION OF THE EMBODIMENTS

The present disclosure is described in detail hereinafter with reference to attached drawings and exemplary embodiments.

Figure 1:
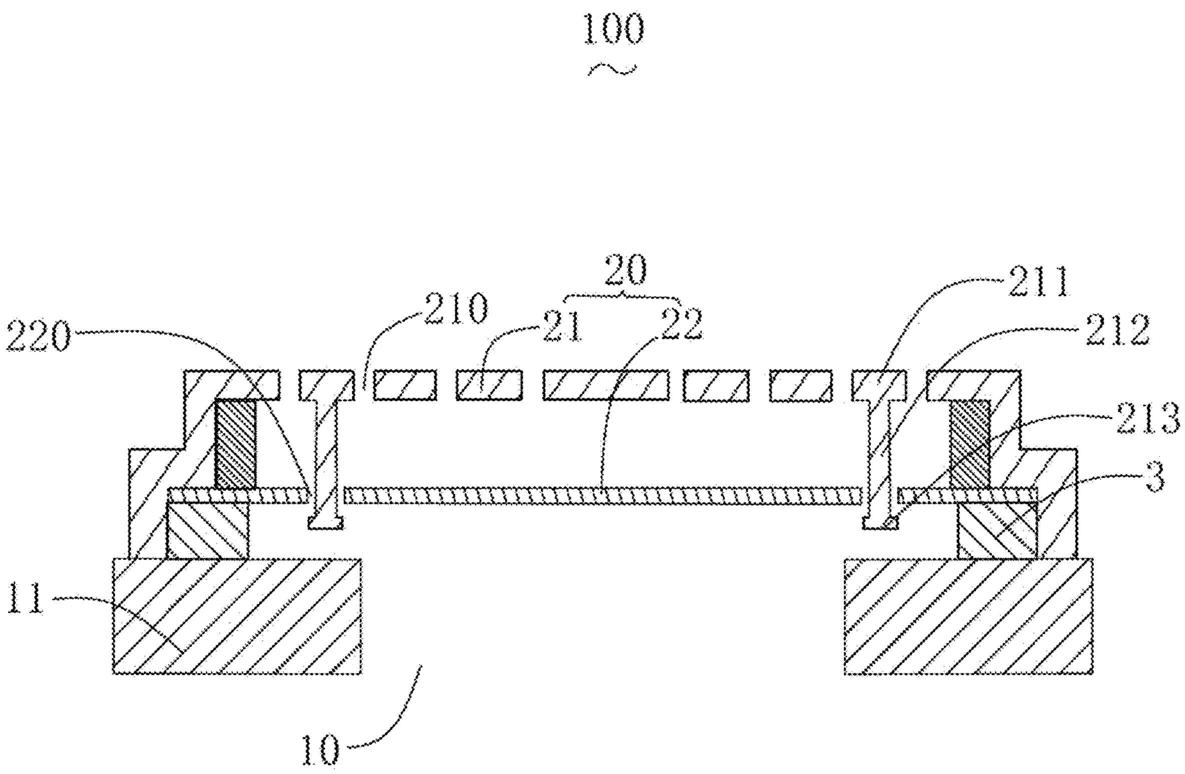
FIG. 1 is a schematic diagram illustrating a partial structural of an electronic device in accordance with some embodiments.
Figure 2:
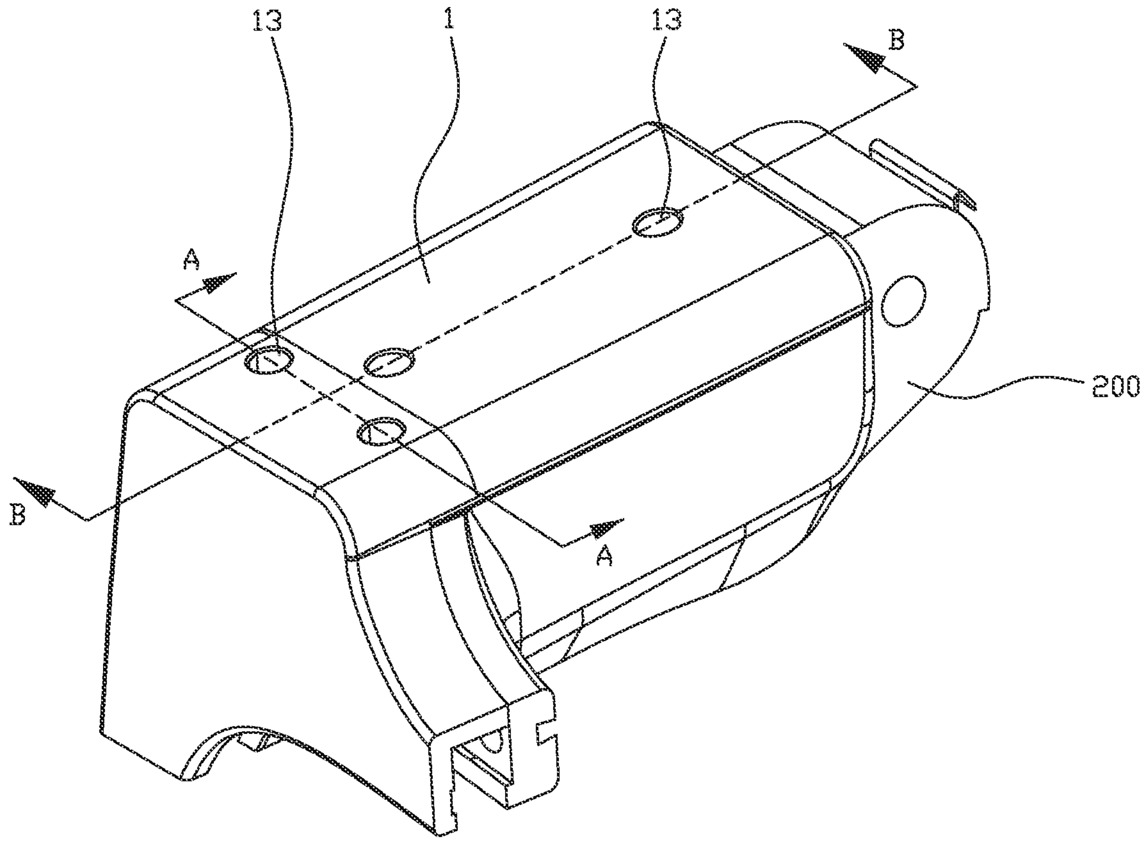
FIG. 2 is a schematic diagram illustrating another partial structural of the electronic device in accordance with some embodiments.
Figure 3:
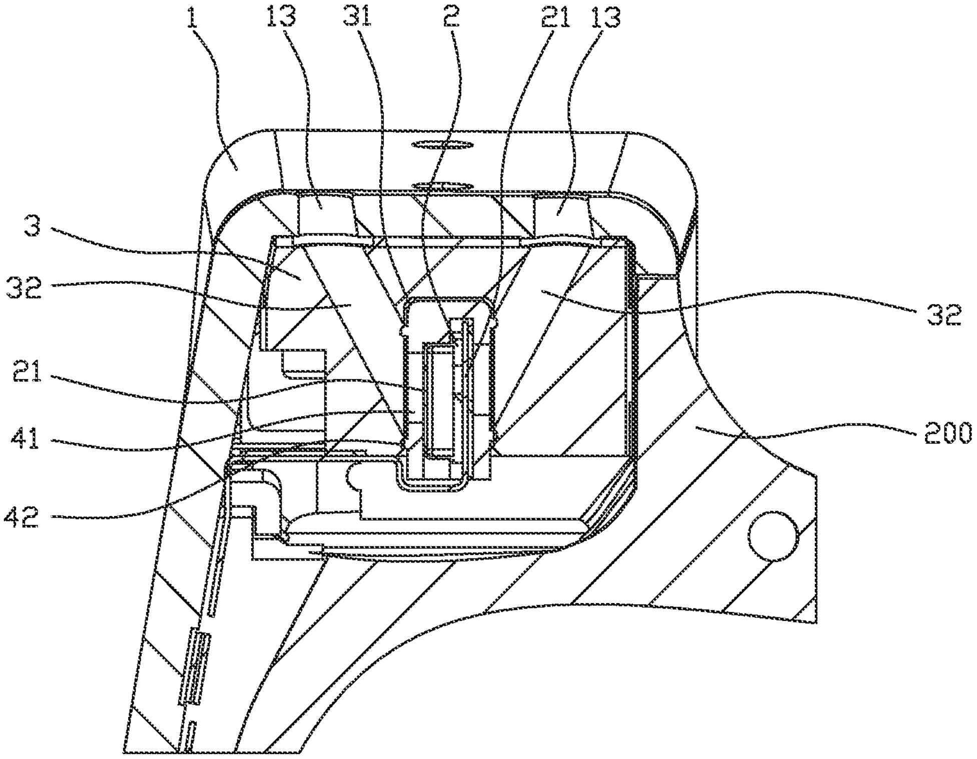
FIG. 3 is a schematic diagram illustrating a sectional view in an A-A direction of the partial structural of the electronic device in FIG. 2.
Figure 4:
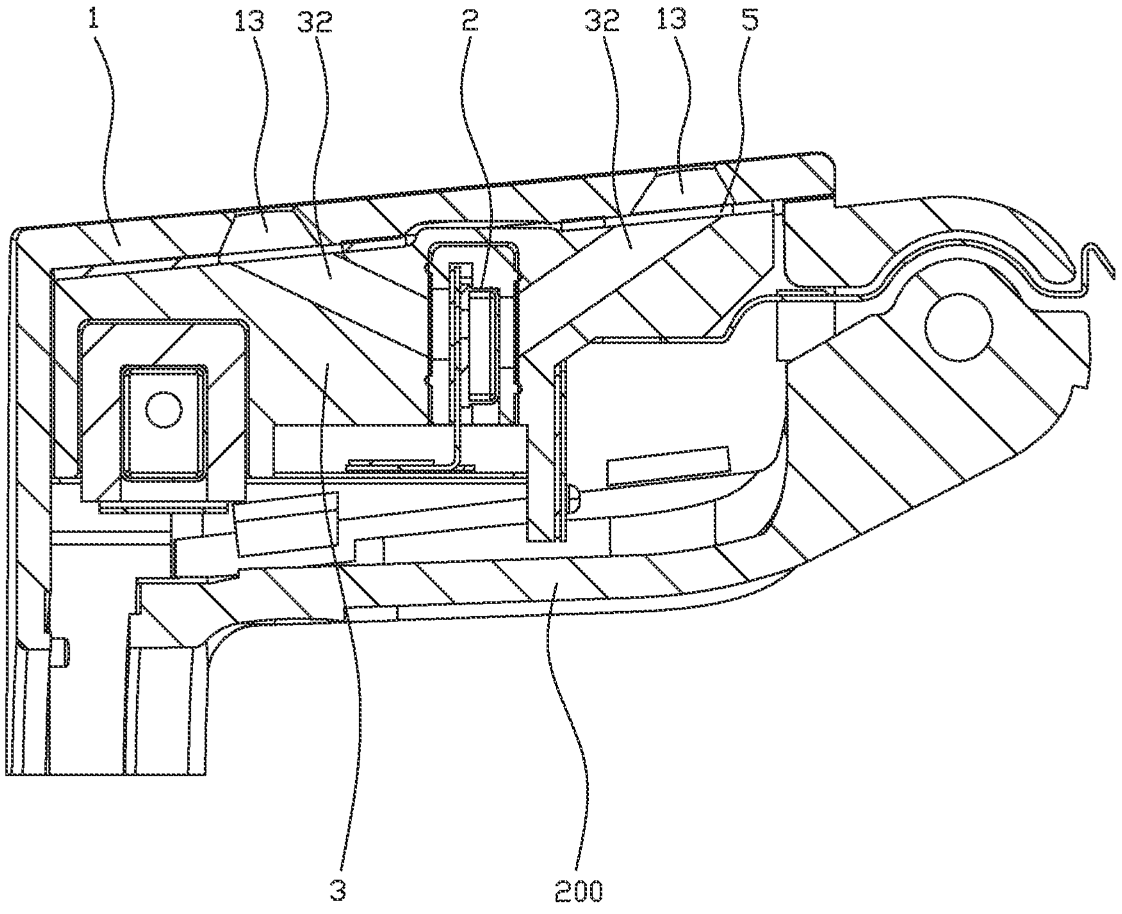
FIG. 4 is a schematic diagram illustrating a sectional view in a B-B direction of the partial structural of the electronic device in FIG. 2.
Figure 5:
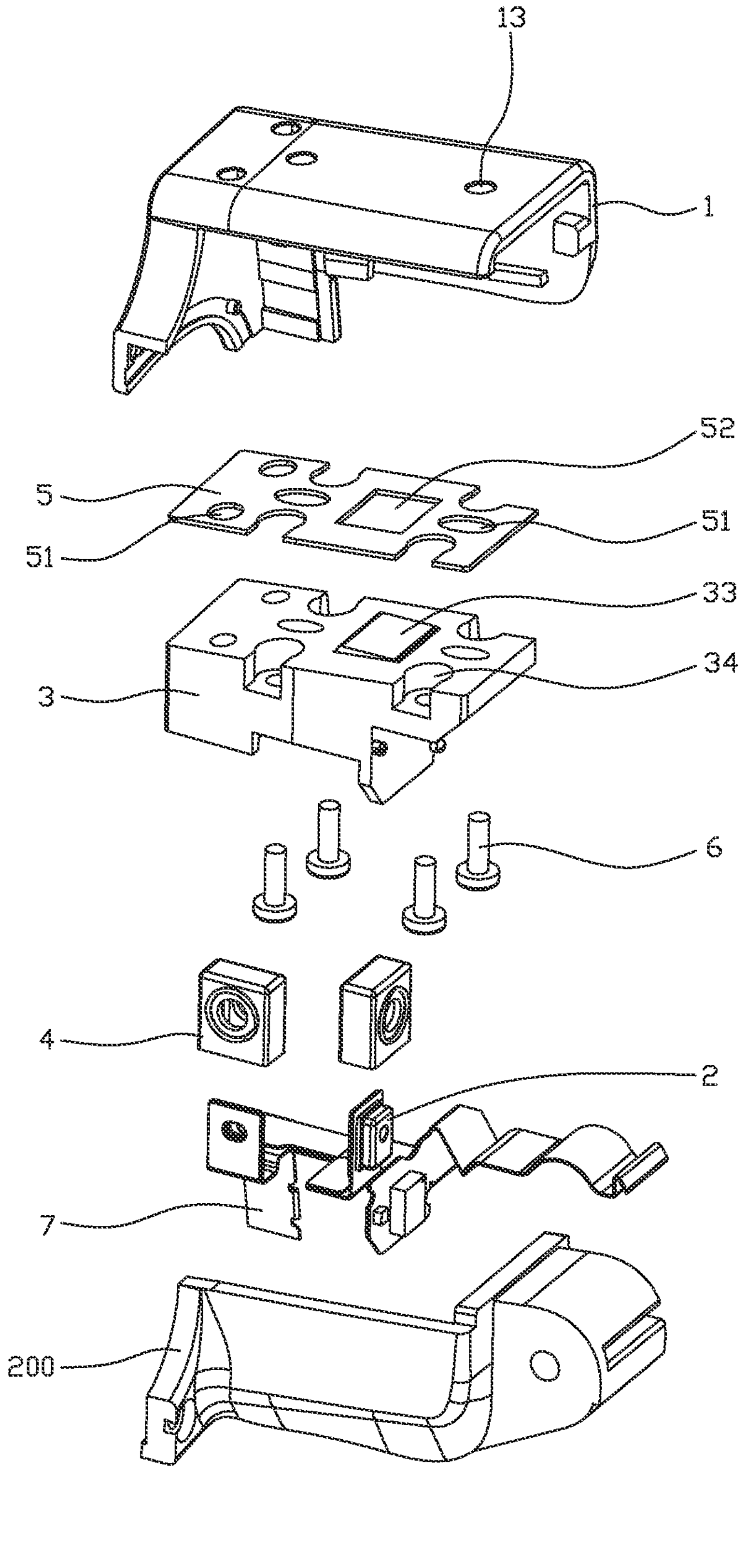
FIG. 5 is a schematic diagram illustrating a three-dimensional exploded view of the partial structural of the electronic device in FIG. 2.
Figure 6:
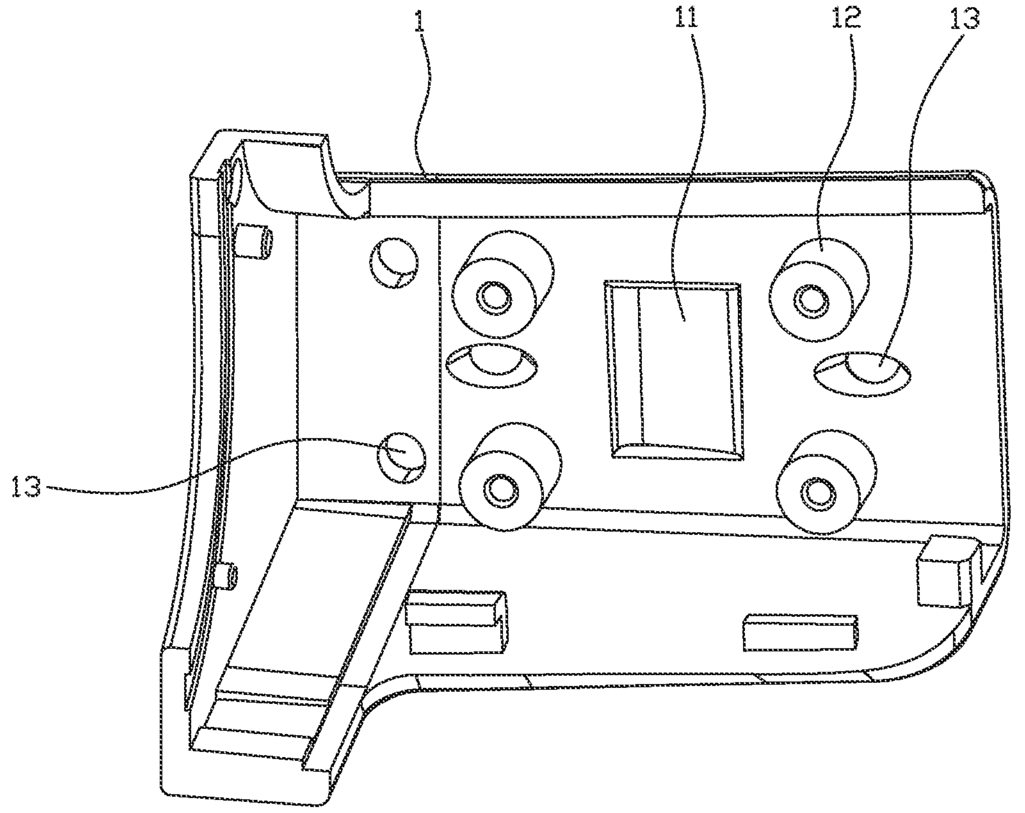
FIG. 6 is a schematic diagram illustrating a three-dimensional view of a front shell in a directional bilateral sound intake-based MIC assembly in accordance with some embodiments.

With reference to FIG. 1, an electronic device 10 is provided. The electronic device 10 includes a directional bilateral sound intake-based MIC assembly 100. In FIG. 1, the electronic device 10 is a pair of augmented reality (AR) glasses. However, in some embodiments, the electronic device 10 may also be an AR headset, a pair of virtual reality (VR) glasses, a VR headset, a pair of mixed reality (MR) glasses, an MR headset, a mobile phone, a tablet, or the like, and is not limited herein.

With reference to FIG. 2 to FIG. 6, the directional bilateral sound intake-based MIC assembly 100 includes a front shell 1 with paired sound inlet holes 13 and a microphone 2 disposed on an inner side of the front shell 1. Two receiving holes 21 are defined in the microphone 2. The MIC assembly further includes a fixture 3 disposed within the inner side of the front shell 1. An assembling chamber 31 and two sound inlet channels 32 in communication with the assembling chamber 31 are defined in the fixture 3. The microphone 2 is mounted within the assembling chamber 31. The two receiving holes 21 of the microphone are in communication with the two sound inlet channels 32 respectively. The two sound inlet channels 32 are in communication with a same pair of two sound inlet holes 13 respectively. The electronic device 10 further includes a rear shell 200 in engagement with the front shell 1 to form a receiving chamber, and a printed circuit board 7 electrically connected to the microphone 2 or other electronic components in the receiving chamber.

In the embodiment, by incorporating a separate fixture 3 to be assembled with the inner side of the front shell 1, the microphone 2 is assembled within the assembling chamber 31 of the fixture 3, and the paired sound inlet holes 13 in the front shell 1 are communicated to the receiving holes 21 of the microphone 2 via the two sound inlet channels 32 within the fixture 3, such that performance of the electronic device is ensured. Both the front shell 1 and the fixture 3 can be separately machined. The sound inlet holes 13 in the front shell 1 allow more freedom and eliminate unacceptable sharp edges, thereby satisfying aesthetic design requirements. The external ports of the sound inlet channels 32 in the fixture 3 are not constrained by appearance and can be machined using various methods such as molds or CNC. Particularly, molds achieve low-cost, high-yield mass production with simplified designs and lower costs.

Furthermore, the two sound inlet channels 32 are connected to two opposite sides of the assembling chamber 31 respectively. Specifically, the two sound inlet channels 32 extend radially from their respective assembling chambers 31 towards the front shell 1, that is, the two sound inlet channels 32 are in a ‘splayed’ shape. The two sound inlet channels 32 are located at two opposite sides of the microphone.

Furthermore, the MIC assembly includes a soft elastic member 4 wrapped around the outer side of the microphone 2 and fitted within the assembling chamber 31. A first passage hole 41 communicating the receiving hole 21 and the corresponding sound inlet passage 32 is defined in the soft elastic member 4. A sealing rib 42 encircling the first passage hole 41 and abutting against an inner side wall of the assembling chamber 31 is disposed on the outer side of the soft elastic member 4. In this design, the soft elastic member 4 is made of Silica gel material. The microphone 2 is assembled within the soft elastic member 4 in an inference-fit fashion. When the soft elastic member 4 wraps the microphone 2 and is mounted within the assembling chamber 31, an interference-fit engagement is defined between the soft elastic member 4 and the inner wall of the assembling chamber 31. This ensures stable mounting of the microphone 2 and the fixture 3. The sealing rib 42 arranged on an outer periphery of the first passage hole 41 abuts against the inner wall of the assembling chamber 31, thereby ensuring the sealing performance between the receiving hole 21 of the microphone 2 and the sound inlet channel 32.

Additionally, the MIC assembly includes a bonding piece 5 sandwiched between the front shell 1 and the fixture 3. A second passage hole 51 communicating the sound inlet passage 32 and the corresponding sound inlet hole 13 is defined in the bonding piece 5. The bonding piece 5 is made of a foamed porous material, and adhesive layers are provided on both sides of the bonding piece 5. Preferably, the bonding piece 5 is made of a foam material to ensure the seal between the sound passage 32 and the sound inlet hole 13, such that the sealing requirements between the sound inlet hole 13 and the receiving hole 21 are satisfied.

Furthermore, the fixture 3 is protruded on one side close the front shell 1 to form a limiting platform 33. The inner side of the front shell 1 is recessed to form a limiting groove 11 that matches the limiting platform 33. Limiting holes 52 configured to allow the limiting platform to pass through are defined in the bonding piece 5. When the fixture 3 is mounted on the inner side of the front shell 1, the limiting platform 33 is fitted into the limiting groove 11, such that precise assembly between the fixture 3 and the front shell 1 is ensured.

Moreover, at least two spaced mounting columns 12 are disposed on the inner side of the front shell 1, and mounting slots 34 in one-to-one correspondence to the mounting columns 12 are provided in one side of the fixture 3. The mounting columns 12 are fitted into the mounting slots 34, and the fixture 3 is secured to the mounting columns 12 by screws 6. Specifically, four mounting columns 12 are arranged on the inner side of the front shell 1, where a threaded hole is defined in each of the mounting columns 12. Correspondingly, four mounting slots 34 are arranged in one side of the fixture 3. During assembly of the fixture 3, the mounting columns 12 are fitted into the mounting slots 34, and then upon passing through the fixture 3, the screws 6 are tightened into the threaded holes in the mounting columns 12. This process accurately and securely secures the fixture 3 to the front shell 1.

Furthermore, in the embodiment, two sets of paired sound inlet holes 13 disposed perpendicular to each other are defined in the front shell 1. The MIC assembly includes two microphones 2 in one-to-one correspondence to the two sets of paired sound inlet holes 13, and two assembling chambers 31 configured to separately mount the two microphones 2 and the sound inlet channels 32 configured to communicate the assembling chambers 31 with the sound inlet holes 13 in the corresponding set are defined in the fixture 3. Specifically, the paired sound inlet holes 13 each include two sound inlet holes 13. The paired sound inlet holes in one set are symmetrically arranged about a connection line of another set of paired sound inlet holes 13 as an axis of symmetry. The four sound inlet holes 13 in the two sets of paired sound inlet holes 13 are arranged in a 'Y' shape. It should be understood that in some embodiments, the paired sound inlet holes 13 may be arranged in one set, two sets, three sets, or the like. Furthermore, the arrangement of each set of paired sound inlet holes 13 may be adaptively adjusted according to actual requirements.

Described above are merely exemplary embodiments of the present disclosure. It should be noted that persons of ordinary skill in the art would make various improvements without departing from the inventive concept of the present disclosure, and such improvements shall fall within the protection scope of the present disclosure.

What is claimed is:

1. A directional bilateral sound intake-based MIC assembly, comprising:

a front shell with paired sound inlet holes and a microphone disposed on an inner side of the front shell, the microphone having two receiving holes;

wherein the MIC assembly further comprises a fixture disposed within the inner side of the front shell, an assembling chamber and two sound inlet channels in communication with the assembling chamber are defined in the fixture, the microphone is mounted within the assembling chamber, the two receiving holes of the microphone are in communication with the two sound inlet channels respectively, and the two sound inlet channels are in communication with a same pair of two sound inlet holes respectively, the two sound inlet channels are connected to two opposite sides of the assembling chamber respectively and extend radially from the respective assembling chambers towards the front shell, the two sound inlet channels are located at two opposite sides of the microphone.

2. The directional bilateral sound intake-based MIC assembly according to claim 1, wherein the MIC assembly further comprises a soft elastic member wrapped around an outer side of the microphone and embedded within the assembling chamber; and a first passage hole configured to communicate the receiving hole with a corresponding sound inlet channel is defined in the soft elastic member.

3. The directional bilateral sound intake-based MIC assembly according to claim 2, wherein a sealing rib encircling the first passage hole and abutting against an inner wall of the assembling chamber is disposed on an outer side of the soft elastic member.

4. The directional bilateral sound intake-based MIC assembly according to claim 1, further comprising: a bonding piece sandwiched between the front shell and the fixture; wherein a second passage hole communicating the sound inlet channel with a corresponding sound inlet hole is defined in the bonding piece.

5. The directional bilateral sound intake-based MIC assembly according to claim 4, wherein the bonding piece is made of a foamed porous material, and adhesive layers is are provided on both sides of the bonding piece.

6. The directional bilateral sound intake-based MIC assembly according to claim 4, wherein the fixture is protruded on one side close to the front shell to form a limiting platform, the inner side of the front shell is recessed to form a limiting groove matching the limiting platform, and a limiting hole allowing the limiting platform to pass through is defined in the bonding piece.

7. The directional bilateral sound intake-based MIC assembly according to claim 1, wherein at least two spaced mounting columns are arranged on the inner side of the front shell, mounting slots in one-to-one correspondence to the mounting columns are defined in one side of the fixture, the mounting columns are embedded in the mounting slots, and the fixture is secured to the mounting columns by screws.

8. A directional bilateral sound intake-based MIC assembly, comprising:

a front shell with two sets of paired sound inlet holes and two microphones disposed on an inner side of the front shell, wherein the MIC assembly further comprises a fixture disposed within the inner side of the front shell, the two microphones are in one-to-one correspondence to the two sets of paired sound inlet holes, and two assembling chambers configured to separately mount the two microphones and sound inlet channels configured to communicate the assembling chambers with the sound inlet holes in the corresponding set are defined in the fixture, the two sound inlet channels in a same set are connected to two opposite sides of a corresponding assembling chamber respectively, the two sound inlet channels extend radially from the respective assembling chambers towards the front shell, the two sound inlet channels are located at two opposite sides of the corresponding microphone.

9. The directional bilateral sound intake-based MIC assembly according to claim 8, wherein the MIC assembly further comprises a soft elastic member wrapped around an outer side of a respective microphone and embedded within a corresponding assembling chamber; and a first passage hole configured to communicate the receiving hole with a corresponding sound inlet channel is defined in the soft elastic member.

10. The directional bilateral sound intake-based MIC assembly according to claim 9, wherein a sealing rib encircling the first passage hole and abutting against an inner wall of the assembling chamber is disposed on an outer side of the soft elastic member.

11. The directional bilateral intake-based MIC assembly according to claim 8, further comprising: a bonding piece sandwiched between the front shell and the fixture; wherein a second passage hole communicating the sound inlet channel with a corresponding sound inlet hole is defined in the bonding piece.

12. The directional bilateral sound intake-based MIC assembly according to claim 11, wherein the bonding piece is made of a foamed porous material, and adhesive layers is are provided on both sides of the bonding piece.

13. The directional bilateral sound intake-based MIC assembly according to claim 11, wherein the fixture is protruded on one side close to the front shell to form a limiting platform, the inner side of the front shell is recessed to form a limiting groove matching the limiting platform, and a limiting hole allowing the limiting platform to pass through is defined in the bonding piece.

14. The directional bilateral sound intake-based MIC assembly according to claim 8, wherein at least two spaced mounting columns are arranged on the inner side of the front shell, mounting slots in one-to-one correspondence to the mounting columns are defined in one side of the fixture, the mounting columns are embedded in the mounting slots, and the fixture is secured to the mounting columns by screws.

15. The directional bilateral sound intake-based MIC assembly according to claim 8, wherein the paired sound inlet holes in one set are symmetrically arranged about a connection line of another set of paired sound inlet holes as an axis of symmetry.

16. The directional bilateral sound intake-based MIC assembly according to claim 8, wherein the four sound inlet holes 13 in the two sets of paired sound inlet holes 13 are arranged in a 'Y' shape.

17. An electronic device, comprising: the directional bilateral sound intake-based MIC assembly according to claim 1.

18. An electronic device, comprising: the directional bilateral sound intake-based MIC assembly according to claim 8.

* * * * *